US012526224B2

(12) United States Patent
Goel

(10) Patent No.: US 12,526,224 B2
(45) Date of Patent: Jan. 13, 2026

(54) METHODS, SYSTEMS, AND COMPUTER READABLE MEDIA FOR SELECTING NETWORK FUNCTION (NF) PROFILES OF NF SET MATES TO ENABLE ALTERNATE ROUTING

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 18/484,402

(22) Filed: Oct. 10, 2023

(65) Prior Publication Data

US 2025/0119376 A1 Apr. 10, 2025
US 2025/0373538 A9 Dec. 4, 2025

(51) Int. Cl.
*H04L 29/08* (2006.01)
*H04L 45/00* (2022.01)
*H04L 45/302* (2022.01)

(52) U.S. Cl.
CPC ............ *H04L 45/22* (2013.01); *H04L 45/308* (2013.01)

(58) Field of Classification Search
CPC ............................. H04L 45/22; H04L 45/308
See application file for complete search history.

(56) References Cited

U.S. PATENT DOCUMENTS 10,243,789 B1 * 3/2019 Naylor ................ H04L 43/0894
10,637,753 B1    4/2020 Taft et al.
(Continued)

FOREIGN PATENT DOCUMENTS

CN    110798360 A    2/2020
CN    116057924 B    6/2024
(Continued)

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.4.0, p. 1—(Sep. 2023).

"3rd Generation Partnership Project; Technical Specification Group Services and System Aspects; System architecture for the 5G System (5GS); Stage 2 (Release 18)", 3GPP TS 23.501, V18.3.0, p. 1—(Sep. 2023).

(Continued)

*Primary Examiner* — Nicholas P Celani
*Assistant Examiner* — Wuji Chen
(74) *Attorney, Agent, or Firm* — Jenkins, Taylor & Hunt, P.A.

(57) ABSTRACT

A method for selecting NF profiles of NF set mates for alternate routing includes receiving an NF discovery request, accessing an NF profiles database, and identifying NF profiles that match query parameters in the NF discovery request. The method further includes determining a value of an NF profiles limit parameter, selecting a first number of NF profiles that is less than the value of the NF profiles limit parameter, selecting a second number of NF profiles, wherein the NF profiles in the second number of NF profiles correspond to NF set mates of NFs corresponding to NF profiles in the first number of NF profiles and a sum of the first and second numbers number is less than or equal to the value of the NF profiles limit parameter, and generating and transmitting an NF discovery response including the NF profiles in the first and second numbers of NF profiles.

20 Claims, 10 Drawing Sheets

(56) References Cited

U.S. PATENT DOCUMENTS

| | | | |
|---|---|---|---|
| 11,438,828 B2* | 9/2022 | Sapra | H04L 67/51 |
| 11,716,252 B2 | 8/2023 | Rajput et al. | |
| 11,888,946 B2* | 1/2024 | Goel | H04L 67/52 |
| 2006/0010224 A1* | 1/2006 | Sekar | H04L 61/4511 |
| | | | 709/217 |
| 2009/0222584 A1* | 9/2009 | Josefsberg | H04L 61/4511 |
| | | | 709/245 |
| 2019/0230556 A1* | 7/2019 | Lee | H04W 28/16 |
| 2019/0238425 A1* | 8/2019 | Mladin | H04L 41/5048 |
| 2019/0357216 A1* | 11/2019 | Jung | H04W 76/14 |
| 2020/0053828 A1* | 2/2020 | Bharatia | H04W 76/11 |
| 2020/0136911 A1* | 4/2020 | Assali | H04L 41/5096 |
| 2020/0267214 A1* | 8/2020 | Yang | H04L 67/1036 |
| 2020/0367045 A1* | 11/2020 | Jeong | H04W 36/12 |
| 2021/0007023 A1* | 1/2021 | Umapathy | H04W 36/0061 |
| 2021/0258861 A1* | 8/2021 | Wang | H04W 48/10 |
| 2021/0306211 A1* | 9/2021 | Landais | H04L 43/0817 |
| 2021/0385286 A1* | 12/2021 | Wang | H04L 67/51 |
| 2022/0038999 A1* | 2/2022 | Sapra | H04W 48/16 |
| 2022/0053372 A1* | 2/2022 | Shekhar | H04L 67/56 |
| 2022/0070648 A1* | 3/2022 | Krishan | H04L 67/562 |
| 2022/0103443 A1* | 3/2022 | Mary | H04L 43/20 |
| 2022/0191294 A1* | 6/2022 | Yang | H04L 67/51 |
| 2022/0247827 A1* | 8/2022 | Das | G06F 11/1423 |
| 2022/0295384 A1* | 9/2022 | Gupta | H04W 8/12 |
| 2022/0330085 A1* | 10/2022 | Li | H04W 28/10 |
| 2022/0345379 A1* | 10/2022 | Li | H04L 67/561 |
| 2022/0417783 A1* | 12/2022 | Srivastava | H04W 28/0231 |
| 2023/0006895 A1* | 1/2023 | Martinez de la Cruz | |
| | | | H04W 4/50 |
| 2023/0019209 A1* | 1/2023 | Rajput | H04L 67/51 |
| 2023/0052267 A1* | 2/2023 | Goel | H04L 67/51 |
| 2023/0099676 A1* | 3/2023 | Jayaramachar | H04W 4/23 |
| | | | 370/329 |
| 2023/0102122 A1* | 3/2023 | Krishan | H04W 40/34 |
| | | | 370/328 |
| 2023/0179669 A1* | 6/2023 | Yang | H04W 8/005 |
| | | | 709/201 |
| 2023/0179681 A1* | 6/2023 | Krishan | H04L 67/61 |
| | | | 709/223 |
| 2023/0217355 A1* | 7/2023 | Srivastava | H04L 41/0654 |
| | | | 370/329 |
| 2023/0232322 A1* | 7/2023 | Singh | H04W 60/00 |
| | | | 370/329 |
| 2023/0239697 A1* | 7/2023 | Krishan | H04L 41/28 |
| | | | 726/26 |
| 2023/0262025 A1* | 8/2023 | Krishan | H04W 8/26 |
| | | | 709/245 |
| 2023/0291818 A1* | 9/2023 | Yang | H04L 67/563 |
| 2023/0308908 A1* | 9/2023 | Rajput | H04W 24/04 |
| 2023/0309005 A1* | 9/2023 | Rodrigo | H04L 67/60 |
| 2023/0345292 A1* | 10/2023 | Pateromichelakis | |
| | | | H04W 28/0268 |
| 2024/0064197 A1* | 2/2024 | Rodrigo | H04L 67/51 |
| 2024/0064212 A1* | 2/2024 | Rodrigo | H04L 67/1012 |
| 2024/0073786 A1* | 2/2024 | Lu | H04W 48/04 |
| 2024/0196194 A1* | 6/2024 | Lu | H04L 41/5022 |
| 2024/0196196 A1* | 6/2024 | Radier | H04W 12/40 |
| 2024/0364600 A1* | 10/2024 | Bartolome Rodrigo | |
| | | | H04W 8/02 |

FOREIGN PATENT DOCUMENTS

| | | |
|---|---|---|
| EP | 4189863 B1 | 7/2024 |
| JP | 7514383 B2 | 7/2024 |
| KR | 20190088878 A | 7/2019 |
| KR | 20210023299 A | 3/2021 |
| WO | WO 2019/193129 A1 | 10/2019 |
| WO | WO-2021/160774 A1 | 8/2021 |
| WO | WO 2022/025988 A1 | 2/2022 |
| WO | WO-2023/287930 A1 | 1/2023 |

OTHER PUBLICATIONS

Notice of Intent to Grant for European Patent Application Serial No. 21715008.5 (Feb. 15, 2024).

Office Action for Chinese Patent Application Serial No. 202180038044.1 (Nov. 13, 2023).

"Maximum payload size of NFDiscover Response", 3GPP TSG-CT WG4 Meeting #89 (2019).

Office Action for Japanese Patent Application Serial No. 2023503051 (Nov. 28, 2023).

Notice of Allowance for U.S. Appl. No. 16/942,713 (Nov. 29, 2021).

Ex Parte Quayle Action for U.S. Appl. No. 16/942,713 (Sep. 13, 2021).

Notification of Transmittal of the International Search Report and the Written Opinion of the International Searching Authority, or the Declaration for U.S. Patent Application Serial No. PCT/US2021/020121 (June 1. 2021).

Commonly-Assigned, co-pending U.S. Appl. No. 16/942,713 for "Methods, Systems, and Computer Readable Media for Providing Network Function Discovery Service Enhancements," (Unpublished, filed Jul. 29. 2020).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

Notice of Allowance and Fee(s) Due for U.S. Appl. No. 17/376,082 (Apr. 28, 2023).

"5G; 5G System; Technical Realization of Service Based Architecture; Stage 3 (3GPP TS 29.500 version 16.7.0 Release 16)", ETSI TS 129 500, V16.7.0, pp. 1-98 (Apr. 2021).

Final Office Action for U.S. Appl. No. 17/376,082 (Feb. 14, 2023).

Notification of Transmittal of the International Search Report and the Written Opinion of the International Searching Authority, or the Declaration for International Application No. PCT/US2022/037031 (Nov. 8, 2022).

Commonly-Assigned, co-pending U.S. Appl. No. 17/376,082 for "Methods, Systems and Computer Readable Media for Generating Network Function (NF) Set Load Information Aware NF Discovery Response" (Unpublished, filed Jul. 30, 2021).

Non-Final Office Action for U.S. Appl. No. 17/376,082 (Aug. 3, 2022).

"5G; 5G System; Network function repository services; Stage 3" (3GPP TS 29.510, V16.5.0 Release 16), ETSI TS 129.510 V16.5.0, pp. 1-210 (Nov. 2020).

"5G, 5G System; Technical Realization of Service Based Architecture; Stage 3 (3GPP TS 29.500 version 16.4.0 Release 16)", pp. 1-82, (Nov. 2020).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Services and System Aspects; Procedures for the 5G System (5GS); Stage 2 (Release 17)," 3GPP TS 23.502, V17.0.0, pp. 1-489 (Mar. 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-163 (Mar. 2021).

"3rd Generation Partnership Project; Technical Specification Group Core Network and Terminals; Study on Load and Overload Control of SGC Service Based Interfaces; (Release 16)," 3GPP TR 29.843, V16.0.0, pp. 1-39 (Sep. 2019).

Office Action for Chinese Patent Application Serial No. 202180038044.1 (Mar. 8, 2024).

Notification to Grant Patent Right for Chinese Patent Application Serial No. 202180038044.1 (May 16, 2024).

Notice of Allowance for Japanese Patent Application Serial No. 2023503051 (Jun. 4, 2024).

(56) References Cited

OTHER PUBLICATIONS

Decision to Grant for European Patent Application Serial No. 21715008.5 (Jun. 20, 2024).
Office Action for Japanese Patent Application Serial No. 2023503051 (Apr. 2, 2024).
Intent to Grant for European Patent Application Serial No. 22758608.8 (Jul. 11, 2025).

* cited by examiner

METHODS, SYSTEMS, AND COMPUTER READABLE MEDIA FOR SELECTING NETWORK FUNCTION (NF) PROFILES OF NF SET MATES TO ENABLE ALTERNATE ROUTING

TECHNICAL FIELD

The subject matter described herein relates to managing NF selection in the NF discovery service operation. More particularly, the subject matter described herein relates to methods, systems, and computer readable media for selecting NF profiles of NF set mates to enable alternate routing.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that exists in 5G and other types of networks is that consumer NFs are often unable to discover NFs in the same NF set when the number of NF profiles returned in an NF discovery response is limited and the NF profiles returned are based on priority alone. A consumer NF specifies query parameters in an NF discovery request, and the NRF uses the query parameters to select NF profiles to return to the consumer NF in an NF discovery response. One of the query parameters that can be specified in an NF discovery request is an NF profiles limit parameter, which limits the number of NF profiles that is returned in an NF discovery response. Alternatively, the NRF may be configured with the NF profiles limit parameter. One reason for having the NF profiles limit parameter can be to reduce the number of NF profiles that the consumer NF is required to store and search through to select a producer NF to which a service request should be sent. When an NRF receives an NF discovery request with an NF profiles limit query parameter, the NRF selects the lowest priority (most preferred) NF profiles that match the other query parameters (e.g., target NF type and locality) and returns a number of NF profiles that does not exceed the limit value. In 3GPP standards, a lower priority value indicates that an NF is more preferred than an NF with a higher priority value. The NF profiles with the lowest priorities may not be in the same NF set. As a result, when the consumer NF initially requests service from one NF in an NF set, and that NF fails, the consumer NF is unable to select another NF in the same NF set. NFs in the same NF set share state information, so selecting another NF in an NF set is needed for subsequent requests. However, if the consumer NF does not have the NF profile of another NF in the same NF set as the failed NF, the consumer NF is unable to select an NF in the same NF set, and, as a result, inefficiencies in network communications will occur. For example, the consumer NF may be required to issue another NF discovery request to the NRF to identify the set mates of the failed NF.

In light of these and other difficulties, there exists a need for improved methods, systems, and computer readable media for selecting NF profiles that enable a consumer NF have access to NFs in the same NF set for alternate routing without requiring multiple NF discovery queries to the NRF.

SUMMARY

A method for selecting network function (NF) profiles of NF set mates for alternate routing includes receiving, at an NF repository function (NRF) and from a requesting NF, an NF discovery request. The method further includes accessing, by the NRF, an NF profiles database and identifying, in the NF profiles database, a plurality of NF profiles that match query parameters in the NF discovery request. The method further includes determining, by the NRF, a value of an NF profiles limit parameter for limiting a number of NF profiles returned in an NF discovery response. The method further includes selecting, by the NRF and based on relative priorities assigned to the NF profiles, a first number of the NF profiles that is less than the value of the NF profiles limit parameter. The method further includes selecting, by the NRF, a second number of the NF profiles, wherein the NF profiles in the second number of NF profiles correspond to NF set mates of NFs corresponding to NF profiles in the first number of NF profiles and a sum of the first number and the second number is less than or equal to the value of the NF profiles limit parameter. The method further includes generating an NF discovery response, and including, in the NF discovery response, the NF profiles in the first and second numbers of NF profiles. The method further includes transmitting the NF discovery response to the requesting NF.

According to another aspect of the subject matter described herein, receiving the NF discovery request includes receiving the NF discovery request including the NF profiles limit parameter and determining the value of the NF profiles limit parameter includes reading the value of the NF profiles limit parameter from the NF discovery request.

According to another aspect of the subject matter described herein, the NRF is configured with the value of the NF profiles limit parameter and determining the value of the NF profiles limit parameter includes reading the configured value of the NF profiles limit parameter.

According to another aspect of the subject matter described herein, selecting the second number of NF profiles includes determining a value of an NF set mate selection parameter and setting the second number to the value of the NF set mate selection parameter.

According to another aspect of the subject matter described herein, receiving the NF discovery request includes receiving the NF discovery request including a preferred locality attribute.

According to another aspect of the subject matter described herein, the method for setting the relative values of the NF profiles using the preferred locality attribute.

According to another aspect of the subject matter described herein, the value of the NF profiles limit parameter is a number n and selecting the first number of NF profiles includes selecting k lowest priority NF profiles where k<n.

According to another aspect of the subject matter described herein, selecting the second number of NF profiles includes selecting n–k NF profiles having NF set Ids matching NF set Ids of NF profiles in the first number of NF profiles.

According to another aspect of the subject matter described herein, selecting the n–k NF profiles includes, selecting, for each of n–k lowest priority NF profiles of the k NF profiles, an NF profile of an NF set mate.

According to another aspect of the subject matter described herein, the method for selecting NF profiles of set mates for alternate routing includes, at the requesting NF, receiving the NF discovery response, selecting an NF profile from the first number of NF profiles, routing an initial request to a first NF corresponding to the NF profile, receiving a response to the initial request indicating successful processing of the initial request, detecting failure of the first NF, selecting a second NF from the second number of NF profiles where the second NF is an NF set mate of the first NF and routing a subsequent request relating to the initial request to the second NF.

According to another aspect of the subject matter described herein, a system for selecting network function (NF) profiles of NF set mates for alternate routing includes an NF repository function (NRF) including at least one processor and a memory. The system further includes an NF profiles database stored in the memory. The system further includes an NF profiles selection controller executable by the at least one processor for receiving, from a requesting NF, an NF discovery request, accessing the NF profiles database and identifying, in the NF profiles database, a plurality of NF profiles that match query parameters in the NF discovery request, determining a value of an NF profiles limit parameter for limiting a number of NF profiles returned in an NF discovery response, selecting, based on relative priorities assigned to the NF profiles, a first number of the NF profiles that is less than the value of the NF profiles limit parameter, selecting a second number of the NF profiles, wherein the NF profiles in the second number of NF profiles correspond to NF set mates of NFs corresponding to NF profiles in the first number of NF profiles and a sum of the first number and the second number is less than or equal to the value of the NF profiles limit parameter, generating an NF discovery response, and including, in the NF discovery response, the NF profiles in the first and second numbers of NF profiles, and transmitting the NF discovery response to the requesting NF.

According to another aspect of the subject matter described herein, the NF discovery request includes the NF profiles limit parameter and the NF profiles selection controller is configured to read the value of the NF profiles limit parameter by reading the value of the NF profiles limit parameter from the NF discovery request.

According to another aspect of the subject matter described herein, the NRF is configured with the value of the NF profiles limit parameter and the NF profiles selection controller is configured to determine the value of the NF profiles limit parameter by reading the configured value of the NF profiles limit parameter.

According to another aspect of the subject matter described herein, selecting the second number of NF profiles includes determining a value of an NF set mate selection parameter and setting the second number to the value of the NF set mate selection parameter.

According to another aspect of the subject matter described herein, the NF discovery request includes a preferred locality attribute.

According to another aspect of the subject matter described herein, the NF profiles selection controller is configured to set the relative priorities of NF profiles using the preferred locality attribute.

According to another aspect of the subject matter described herein, the value of the NF profiles limit parameter is a number n and the NF profiles selection controller is configured to select the first number of NF profiles by selecting k lowest priority NF profiles where k<n.

According to another aspect of the subject matter described herein, the NF profiles selection controller is configured to select the second number of NF profiles by selecting n–k NF profiles having NF set Ids matching NF set Ids of NF profiles in the first number of NF profiles.

According to another aspect of the subject matter described herein, the NF profiles selection controller is configured to select the n–k NF profiles by selecting, for each of n–k lowest priority NF profiles of the k NF profiles, an NF profile of an NF set mate.

According to another aspect of the subject matter described herein, a non-transitory computer readable medium having stored thereon executable instructions that when executed by a processor of a computer control the computer to perform steps is provided. The steps include receiving, at a network function (NF) repository function (NRF) and from a requesting NF, an NF discovery request. The steps further include accessing, by the NRF, an NF profiles database and identifying, in the NF profiles database, a plurality of NF profiles that match query parameters in the NF discovery request. The steps further include determining, by the NRF; a value of an NF profiles limit parameter for limiting a number of NF profiles returned in an NF discovery response. The steps further include selecting, by the NRF and based on relative priorities assigned to the NF profiles, a first number of the NF profiles that is less than the value of the NF profiles limit parameter. The steps further include selecting, by the NRF, a second number of the NF profiles, wherein the NF profiles in the second number of NF profiles correspond to NF set mates of NFs corresponding to NF profiles in the first number of NF profiles and a sum of the first number and the second number is less than or equal to the value of the NF profiles limit parameter. The steps further include generating an NF discovery response, and including, in the NF discovery response, the NF profiles in the first and second numbers of NF profiles.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
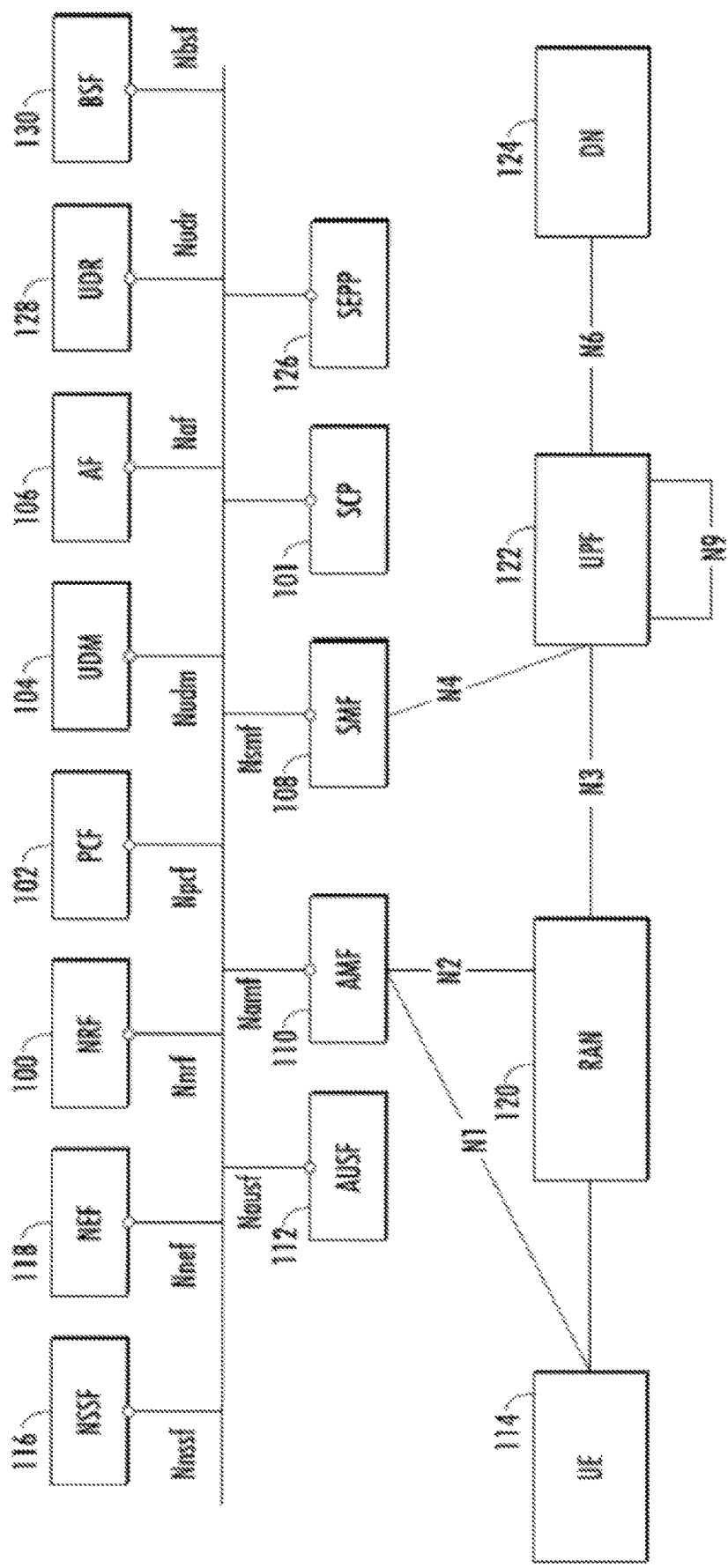
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As described above, one problem with 5G and other types of networks is that an NF discovery response may fail to include NF profiles of producer NFs that are NF set mates of each other. As a result, alternate routing of subsequent requests may fail.

Figure 2:
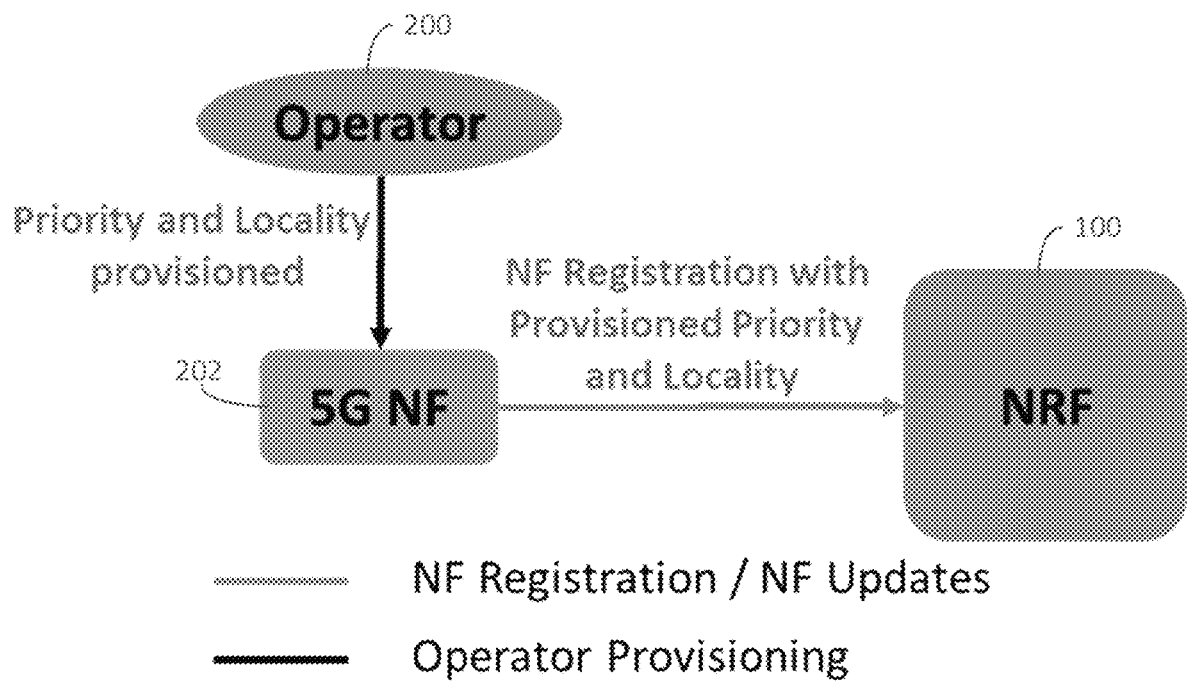
FIG. 2 is a network diagram illustrating provisioning of a 5G NF with priority and locality attribute values and the registration of the NF with the NRF.

FIG. 2 is a network diagram illustrating provisioning of a 5G NF with priority and locality attribute values and the registration of the NF with the NRF. In FIG. 2, a network operator 200 configures an NF 202 with priority and locality attribute values. NF 202 registers with NRF 100. As part of the NF registration, NF 202 includes, in the NF profile being registered, priority and locality attribute values. NRF 100 stores the NF profile for NF 202 in an NF profiles database. NRF 100 uses the priority and locality attribute values to select NF profiles to return to consumer NFs in NF discovery responses.

Figure 3:
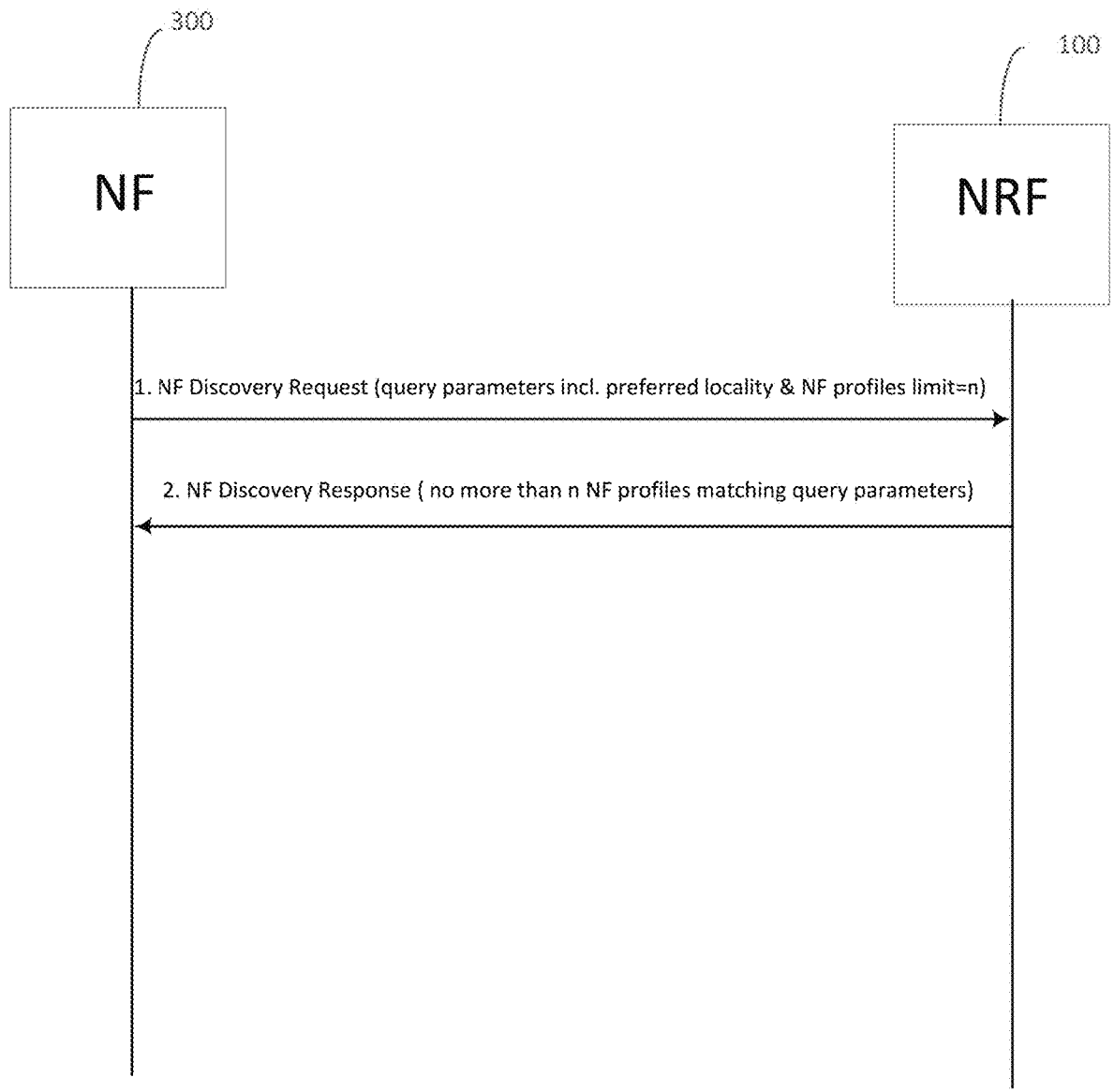
FIG. 3 is a message flow diagram illustrating exemplary messages exchanged between an NF and the NRF in the NF discovery service operation.

FIG. 3 is a message flow diagram illustrating exemplary messages exchanged between an NF and the NRF in the NF discovery service operation. Referring to FIG. 3, in line 1, a consumer NF 300 sends an NF discovery request to NRF 100. Consumer NF 300 includes in the NF discovery request a preferred locality attribute value and an NF profiles limit attribute value. The NF discovery request also includes other parameters, such as a parameter identifying the type of NF or service for which NF discovery is requested. In line 2 of the message flow diagram, NRF 100 processes the NF discovery request by searching its NF profiles database, locating NF profiles of producer NFs having attributes that match the query parameters in the NF discovery request and returning the NF profiles to consumer NF 300 in an NF discovery response. NRF 100 may limit the number of NF profiles returned to the NF profiles limit value n that is specified in the NF discovery request or that is configured with NRF 100. NRF 100 may prioritize the NF profiles by setting the priorities of those with a locality attribute that matches the preferred locality attribute to have the lowest (most preferred) priority values. As will be described in more detail below, because of the NF profiles limit value and the selection of NF profiles based on the preferred locality attribute and corresponding priority, the NF discovery response may fail to include NF profiles of NF set mates, which makes alternate routing more difficult.

Figure 4:
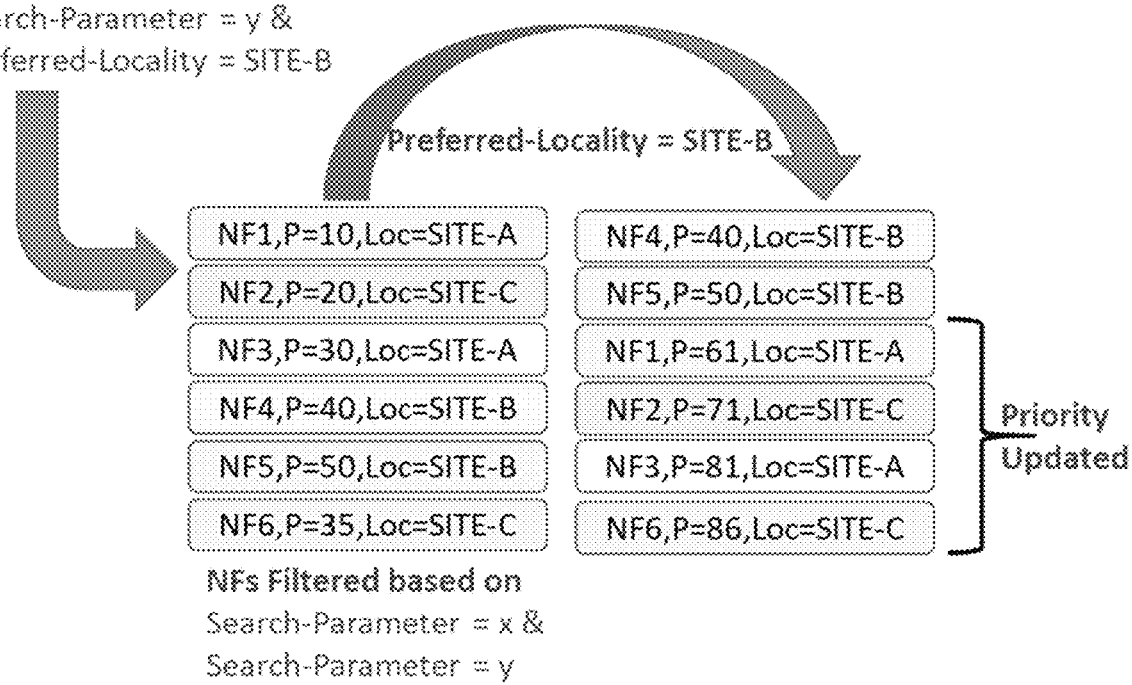
FIG. 4 is a diagram illustrating exemplary processing by an NRF of an NF discovery request using the preferred locality attribute to prioritize NF profiles.

FIG. 4 is a diagram illustrating exemplary processing by an NRF of an NF discovery request using the preferred locality attribute to prioritize the NF profiles. As illustrated above with respect to FIG. 2, priority and locality are attributes that are provisioned by the operator during NF deployment, and the NF registers its NF profile using the operator provisioned priority and locality. Preferred locality is an attribute that is sent by consumer NFs during discovery that can be configured by the network operator to be the most-preferred location of the NF service consumer, which is typically the locality of the NF service consumer.

When the NRF receives an NF discovery request with a preferred locality attribute, the NRF selects NF profiles of NFs matching query parameters in the NF discovery request. The NRF sets the priorities of the NF profiles such that those with localities matching the preferred locality attribute will have lower (more preferred) priority values than the NF profiles with localities that do not match the preferred locality attribute.

As per 3GPP TS 23.501, an NF set is a group of interchangeable NF instances of the same type, supporting the same services and the same network Slice(s). The NF instances in the same NF set may be geographically distributed but have access to the same context data. Context data refers to data relating to transactions with consumer NFs so that when an NF instance fails, another NF instance in the same NF set can process subsequent requests from the consumer NF.

The NF profiles limit is a discovery parameter indicating a maximum number of NF profiles to be returned in an NF discovery response. The NF profiles limit can be provided by a consumer NF to the NRF in the discovery request to limit the number of matching NF profiles to be used for service request routing/rerouting. Alternatively, the NF profiles limit parameter may be a value configured with the NRF by the network operator.

In the example illustrated in FIG. 4, the NF discovery request query includes search parameters x and y and a preferred locality attribute value equal to Site B. When the NRF receives the NF discovery query, the NRF locates NF profiles matching the search parameters x and y. These NF profiles are illustrated by the left-hand column in FIG. 4. Profiles in the left-hand column include priority attribute values and locality attribute values. The NF discovery query specifies the preferred locality attribute value of Site B. Accordingly, the NRF updates the priorities of the NF profiles to make the NF profiles with a locality attribute of Site B have lower priority attribute values than the NF profiles with a locality attribute that does not match the preferred locality query parameter. The right-hand column in FIG. 4 illustrates the NF profiles with updated priority attribute values. It can be seen that the NF profiles of NF4 and NF5 have the lowest (most preferred) priorities because these NF profiles each have a locality attribute value that matches the preferred locality attribute value of Site B from the NF discovery request.

NFs deployed within an NF set share their session/state data with each other and therefore can be interchangeably used by consumer NFs if one or more of NFs within the NF set become unavailable. Consumer NFs select the lowest priority (most preferred) NF of discovered NF instances to receive an initial request. All subsequent requests are required to be sent to either the same producer NF selected for the initial request or to its NF set mates. If multiple NFs exist with the same lowest priority, the NF having the highest available capacity/lowest utilization is selected. For cases where the discovering NFs have used the NF profile limit discovery parameter (in addition to other discovery parameters) or where the NRF restricts sending more than n matching profiles, e.g., based on priority, capacity and/or an operator-configured limit, the NRF-provided discovery response may not include NF profiles of producer NFs that are set mates of each other. Because of this limitation, alternate routing of a subsequent request to an NF set mate of the NF that a consumer NF selected for the initial request becomes impossible, unless the consumer NF issues another NF discovery request to the NRF providing the specific NF set Id. While such a request is functionally possible, requiring the re-querying of the NRF adds processing steps and corresponding processing latency at the consumer NF.

Figure 5:
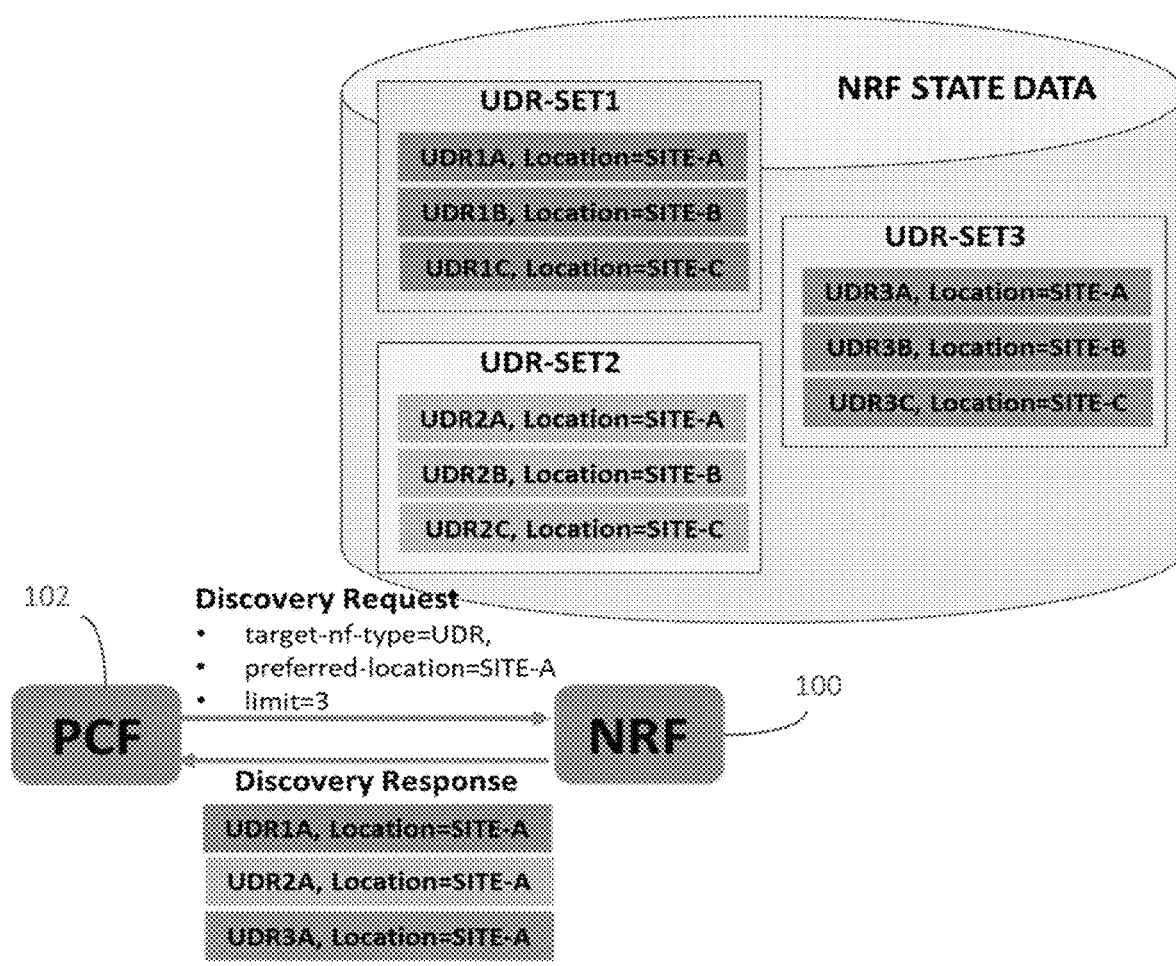
FIG. 5 is a diagram illustrating NF-set based organization of NF profile data in the NRF and the use of the preferred locality attribute value in selecting NF profiles to return in the NF discovery response.

FIG. 5 is a diagram illustrating NF-set based organization of NF profile data in the NRF and the use of the preferred locality attribute value in selecting NF profiles to return in the NF discovery response. Referring to FIG. 5, a PCF 102 issues an NF discovery request to NRF 100. In the NF discovery request, PCF 102 specifies a target NF type of UDR, a preferred locality of Site A, and an NF profiles limit value of 3. NRF 100 accesses its NF profiles database, identifies three lowest priority NF profiles with an NF type of UDR and a preferred locality of Site A, and returns the NF profiles to PCF 102 in an NF discovery response. In FIG. 5, the NF profiles returned in the NF discovery response are those of UDR1A, UDR2A, and UDR3A. It should be noted that UDR1A, UDR2A, and UDR3A are in different NF sets, which leads to the alternate routing problem illustrated in FIG. 6.

Figure 6:
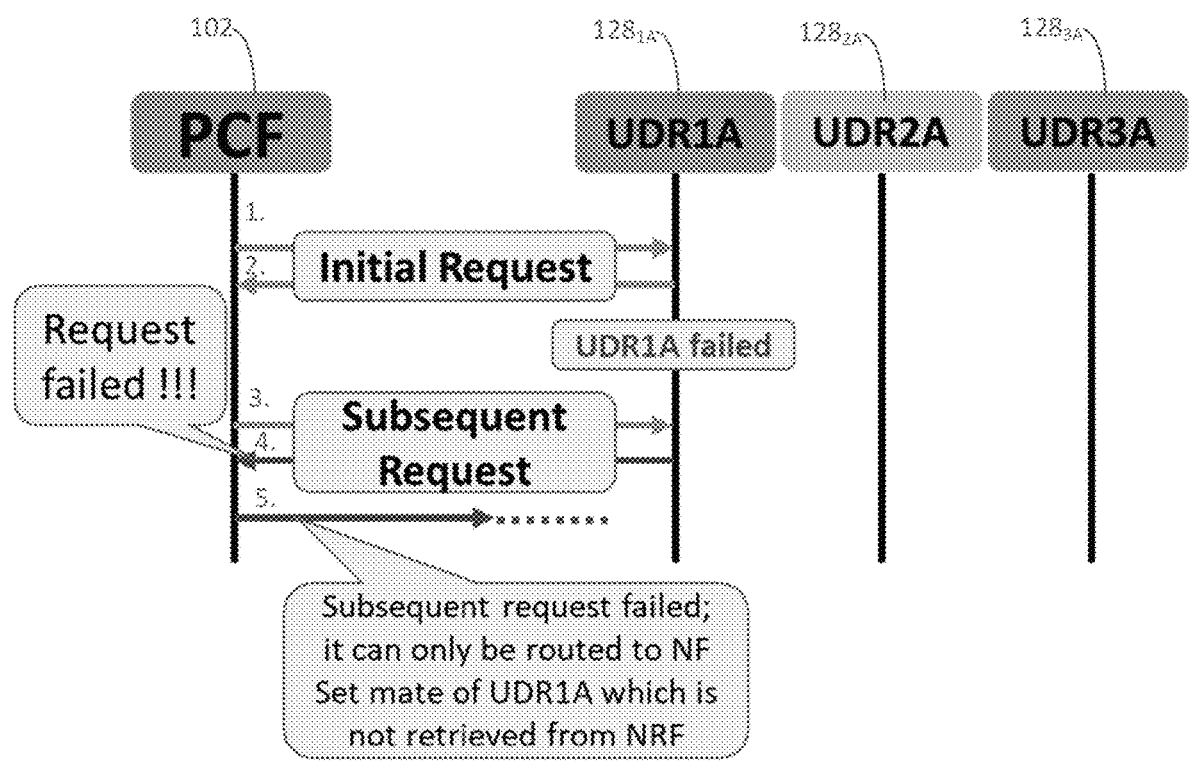
FIG. 6 is a message flow diagram illustrating exemplary routing of an initial request and a subsequent request when the NF to which the initial request is routed fails.

FIG. 6 is a message flow diagram illustrating exemplary routing of an initial request and a subsequent request when the NF to which the initial request is routed fails. In line 1 of FIG. 6, NRF 100 sends an initial request to UDR1A 128$_{1A}$. In line 2, UDR1A 128$_{1A}$ responds successfully to the initial request. After line 2, UDR1A 128$_{1A}$ fails. In line 3, PCF 102 sends a subsequent request to UDR1A 128$_{1A}$. In line 4, PCF 102 detects that UDR1A 128$_{1A}$ has failed, either by the lack of a response to the initial request or by receipt of an error response. In line 5, it would be desirable for PCF 102 to send a subsequent request to an NF set mate of UDR1A 128$_{1A}$. However, as illustrated in FIG. 5, PCF 102 lacks the NF profiles of the NF set mates of UDR1A 128$_{1A}$. Accordingly, alternate routing fails and/or requires a new query to NRF 100.

Instead of providing first matching "limit=n" lowest priority NFs without regard to NF set membership, the NRF should instead:

Step-1: Select the first k lowest priority matching NF profiles, where k<n, and n is the NF profiles limit value, to include in the NF discovery response;

Step-2: Record NF set Ids of each of the k lowest priority matching NF profiles in a list of NF set Ids to match; and Step-3: Add to n−k (n minus k) NF profiles to the discovery response, where the n−k NF profiles have NF set Ids that match one or more of the NF set Ids in the list of NF set Ids recorded in Step 2.

Applying Steps 1-3 will increase the likelihood that the NF discovery response will include NF set Ids of NF set mates that are usable for alternate routing.

Figure 7:
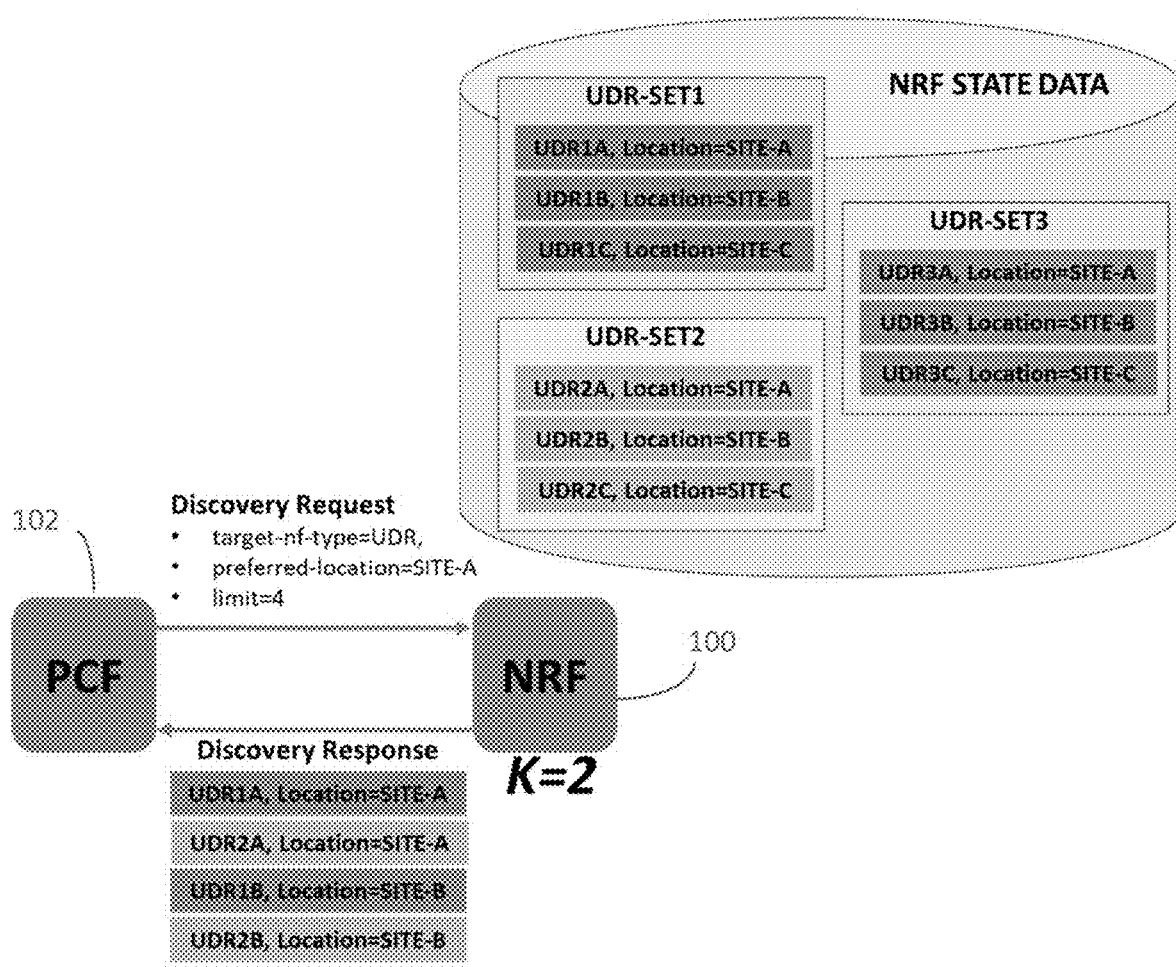
FIG. 7 is a diagram illustrating exemplary processing of an NF discovery request using an NF profiles limit value and an NF set mate selection parameter to allow a consumer NF to receive NF profiles of producer NFs in the same NF set.

FIG. 7 is a diagram illustrating exemplary processing of an NF discovery request using an NF profiles limit value and an NF set mate selection parameter to allow a consumer NF to receive NF profiles of producer NFs in the same NF set. Referring to FIG. 7, PCF 102 sends an NF discovery request to NRF 100. The NF discovery request identifies a target NF type of UDR, a preferred locality attribute value of Site A, and an NF profiles limit value of 4. NRF 100 is configured with or sets the value of k to be 2, where k is the number less than the limit value, which defines the number of NF profiles to select without regard to NF set membership. NRF 100 may then determine the value of an NF set mate selection parameter to be equal to n−k, which determines the number of NF profiles of NF set mates of the initial n NF profiles that will be included in the NF discovery response. If NRF 100 is configured with or receives limit n in the NF discovery request, NRF 100 will select k<n. In this example, because k=2, NRF 100 selects the two lowest priority (most preferred) NF profiles that match the query parameters in the NF discovery request. In FIG. 4, the two lowest priority NF profiles are those of UDR1A and UDR2A. NRF 100 places the NF set Ids of UDR1A and UDR2A in an NF set table. Table 1 shown below illustrates the state of the NF set table after the NF set Ids of UDR1A and UDR2A are added.

TABLE 1

NF Set Table Before Adding NF Set Mates

| Producer NFs whose NF profiles will be included in NF discovery response | NF Set ID |
|---|---|
| UDR1A | NF Set 1A |
| UDR2A | NF Set 2A |

After initially populating the NF set table with the NF set Ids of the k lowest priority NFs that match the NF discovery query parameters, NRF 100 searches for n−k NF profiles that are NF set mates of n−k of the k lowest priority NFs. In FIG. 7, n−k=4−2=2, so NRF 100 searches for the NF profiles of two NFs, one that is an NF set mate of UDR1A and one that is an NF set mate of UDR2A. In this example, NRF 100 locates the NF profiles of UDR1B as an NF set mate of UDR1A and UDR2B as an NF set mate of UDR2A. Table 2 shown below illustrates the results of adding the producer NFs that are NF set mates of UDR1A and UDR2A to the NF set table:

TABLE 2

NF Set Table After Adding NF Set Mates

| Producer NFs whose NF profiles will be included in NF discovery response | NF Set ID |
|---|---|
| UDR1A, UDR1B | NF Set 1A |
| UDR2A, UDR2B | NF Set 2A |

From Table 2, the NF profiles that will be provided to PCF 102 in the NF discovery response include those of UDR1A, UDR1B, UDR2A, and UDR2B. Because the NF discovery response includes at least one NF profile of an NF set mate for each NF profile included in the NF discovery response, alternate routing can be achieved without re-querying the NRF for the NF profiles of NF set mates. In this example, the NRF sets n and k such that for each of the k NF profiles, a single NF profile of an NF set mate is included in the NF discovery response. In other words, k and n−k are equal. In an alternate example, the NRF may set k and n−k to be unequal. If k>n−k, then the NRF may return NF profiles of the n−k lowest priority NFs that are NF set mates of the k NFs initially selected based on priority.

Figure 8:
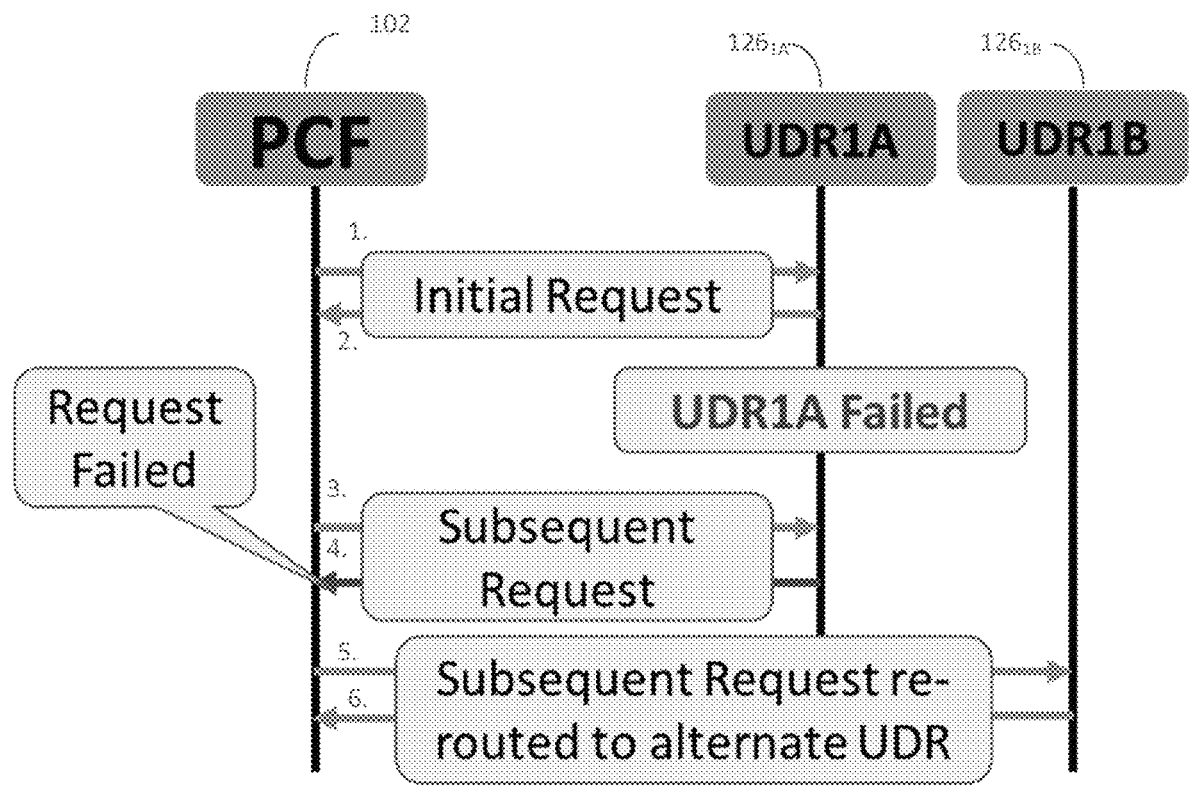
FIG. 8 is a message flow diagram illustrating exemplary routing of an initial request and a subsequent request after the NF that processed the initial request fails.

FIG. 8 is a message flow diagram illustrating exemplary routing of an initial request and alternate routing of a subsequent request after the NF that received the initial request fails. Referring to FIG. 8 in line 1, PCF 102 sends an initial request to UDR1A 126$_{1A}$. UDR1A 126$_{1A}$ receives the request, successfully processes the request, and responds in line 2.

After line 2, UDR1A 126$_{1A}$ fails. In line 3, PCF 102 sends a subsequent request to UDR1A 126$_{1A}$. In line 4, PCF 102 detects failure of UDR1A 126$_{1A}$, either by receipt of an error response or lack of a response to the request in line 3. In line 5, PCF 102 accesses the NF profiles of NF set mates of UDR1A 126$_{1A}$ and selects UDR1B 126$_{1B}$ to handle the subsequent request. Because UDR1B 126$_{1B}$ is an NF set mate of UDR1A 126$_{1A}$, UDR1B 126$_{1B}$ is able to process the subsequent request. In line 6, UDR1B 126$_{1B}$ responds to the subsequent request.

Figure 9:
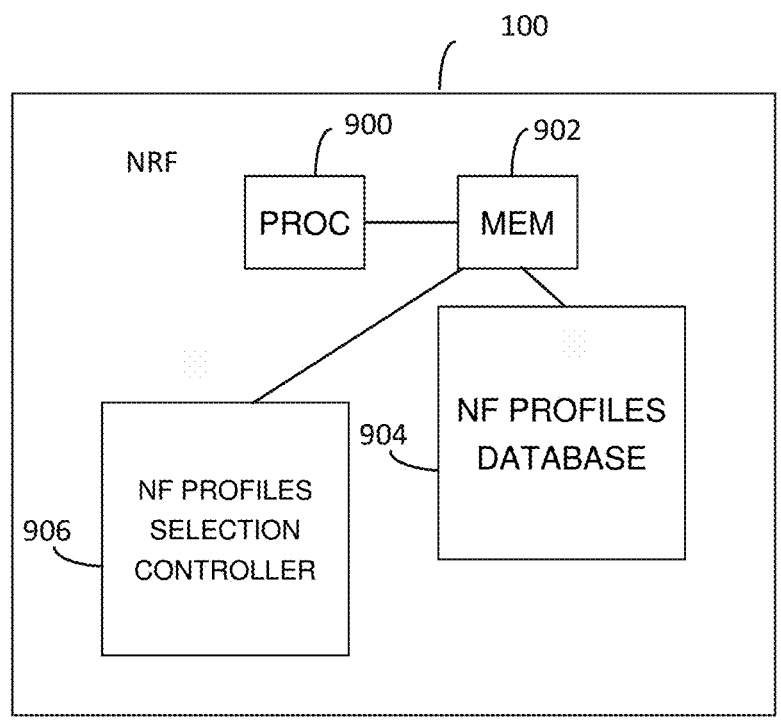
FIG. 9 is a block diagram illustrating an exemplary architecture of an NRF for selecting NF profiles of NF set mates.

FIG. 9 is a block diagram illustrating an exemplary architecture of an NRF for selecting NF profiles of NF set mates to return in NF discovery responses. NRF 100 includes at least one processor 900 and memory 902. NRF 100 further includes an NF profiles database 904 that contains NF profiles of NFs that have registered with NRF 100. NRF 100 further includes an NF profiles selection controller 906 that controls selection of NF profiles to include in NF discovery responses. NF profiles selection controller 906 may perform the operations described herein to ensure that NF profiles returned in NF discovery responses include NF profiles of NF set mates. NF profiles selection controller 906 may be implemented using computer executable instructions stored in memory 902 that are executed by processor 900.

Figure 10:
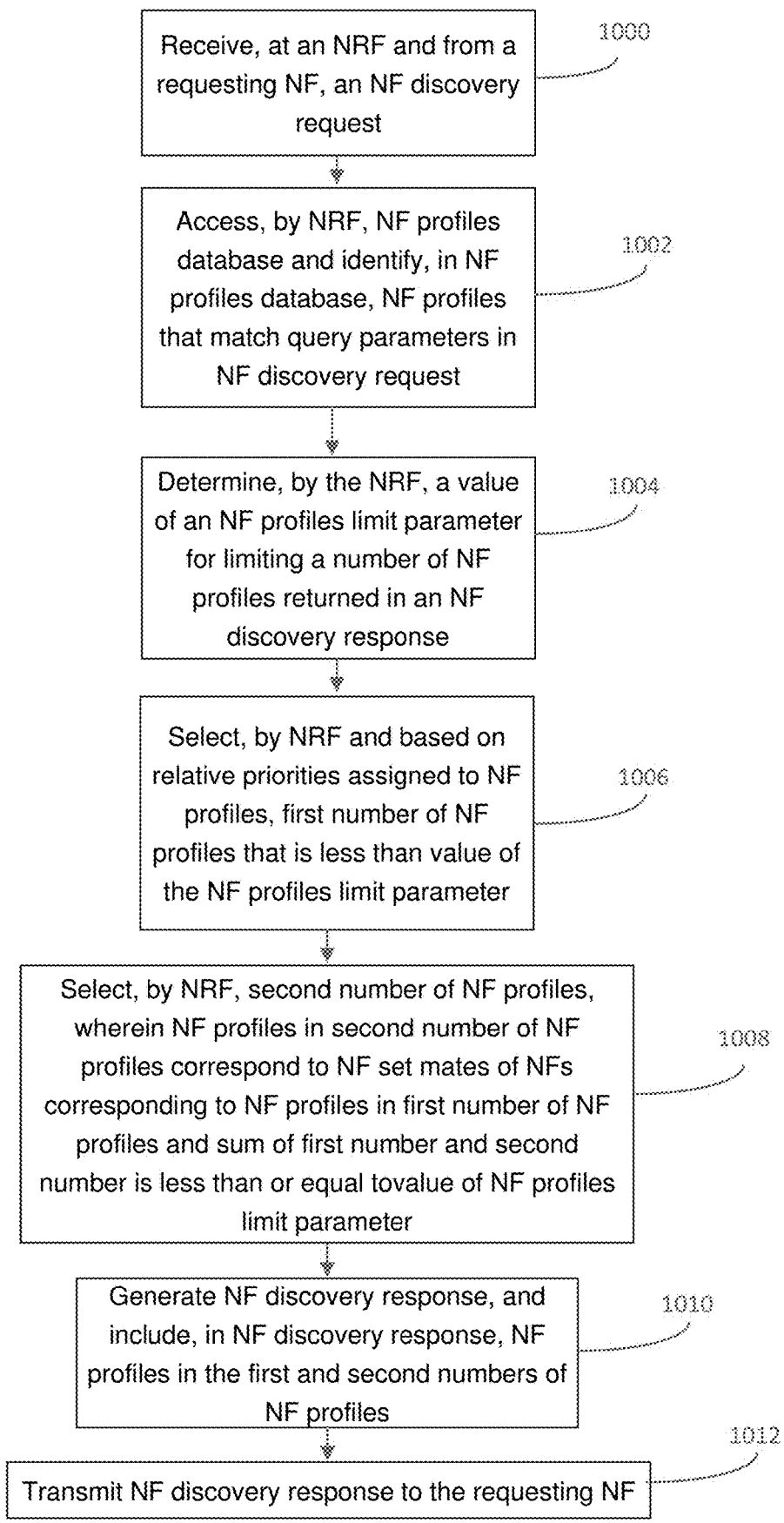
FIG. 10 is a flow chart illustrating an exemplary process for selecting NF profiles of NF set mates.

FIG. 10 is a flow chart illustrating an exemplary process for selecting NF profiles of NF set mates for alternate routing. Referring to FIG. 10, in step 1000, the process includes receiving, at an NRF and from a requesting NF, an NF discovery request. For example, NF profiles selection controller 906 of NRF 100 may receive an NF discovery request from a consumer NF or an SCP.

In step 1002, the process includes accessing, by the NRF, an NF profiles database and identifying, in the NF profiles database, a plurality of NF profiles that match query parameters in the NF discovery request. For example, NF profiles selection controller 906 of NRF 100 may utilize query parameters, such as NF type, to select NF profiles from NF profiles database 904.

In step 1004, the process includes determining, by the NRF, a value of an NF profiles limit parameter for limiting a number of NF profiles returned in an NF discovery response. For example, NF profiles selection controller 906 of NRF 100 may read the NF profiles limit parameter value from the NF discovery request or read the value configured with NRF 100 by the network operator.

In step 1006, the process includes selecting, by the NRF and based on relative priorities assigned to the NF profiles, a first number of the NF profiles that is less than the value of the NF profiles limit parameter. For example, NF profiles selection controller 906 of NRF 100 may select, from the NF profiles matching the query parameters, k NF profiles, where k is a value less than the NF profiles limit value n. The k NF profiles may be those that match the query parameters in the NF discovery request including the preferred locality attribute (if provided). If more than k profiles that match the query parameters including the preferred locality are located, then the k profiles with the lowest priority values may be selected for inclusion in the NF discovery response.

In step 1008, the process includes selecting, by the NRF, a second number of NF profiles, wherein the NF profiles in the second number of NF profiles correspond to NF set mates of NFs corresponding to NF profiles in the first number of NF profiles and a sum of the first number and the second number is less than or equal to the value of the NF profiles limit parameter. For example, NF profiles selection controller 906 of NRF 100 may select n–k lowest priority set mates of n–k of the k NF profiles selected in step 1006. The n–k NF profiles may be those that match the query parameters in the NF discovery request other than preferred locality and that are profiles of NF set mates of the NFs represented by the k NF profiles. If more than n–k profiles that match the query parameters other than preferred locality and that are profiles of NF set mates of NFs corresponding to the k NF profiles are located, then the n–k NF profiles with the lowest priority values may be selected for inclusion in the NF discovery response.

In step 1010, the process includes generating an NF discovery response, and including, in the NF discovery response, the NF profiles in the first and second numbers of NF profiles. For example, NF profiles selection controller 906 of NRF 100 may include, in the NF discovery response, each of the k NF profiles and the NF profiles of the n–k set mates of the NFs corresponding to the k NF profiles.

In step 1012, the process includes transmitting the NF discovery response to the requesting NF. For example, NF profiles selection controller of NRF 100 may transmit the NF discovery response to the requesting consumer NF or SCP.

The disclosure of each of the following references is hereby incorporated herein by reference in its entirety.

REFERENCES

1. $3^{rd}$ Generation Partnership Project; Technical Specification Group Core Network and Terminals; 5G System; Network Function Repository Services; Stage 3 (Release 18) 3GPP TS 29.510 V18.4.0 (2023-09)
2. $3^{rd}$ Generation Partnership Project; Technical Specification Group Services and System Aspects; System architecture for the 5G System; Stage 2 (Release 18) 3GPP TS 23.501 V18.3.0 (2023-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for selecting network function (NF) profiles of NF set mates for alternate routing, the method comprising:
   receiving, at an NF repository function (NRF) and from a requesting NF, an NF discovery request;
   accessing, by the NRF, an NF profiles database and identifying, in the NF profiles database, a plurality of NF profiles that match query parameters in the NF discovery request;
   determining, by the NRF, a value n of an NF profiles limit parameter for limiting a number of NF profiles returned in an NF discovery response;
   instead of selecting n of the NF profiles that match the query parameters without regard to NF set membership, selecting, by the NRF and based on relative priorities assigned to the NF profiles and without regard to the NF set membership, a first number k of the NF profiles that is less than the value n of the NF profiles limit parameter;
   recording NF set Ids of each of the k NF profiles in a list of NF set Ids to match;
   selecting, by the NRF, a second number of the NF profiles having NF set Ids that match the NF set Ids in the list and a sum of the first number k and the second number is less than or equal to the value n of the NF profiles limit parameter;
   generating an NF discovery response, and including, in the NF discovery response, the NF profiles in the first and second numbers of NF profiles; and
   transmitting the NF discovery response to the requesting NF.

2. The method of claim 1 wherein receiving the NF discovery request includes receiving the NF discovery request including the NF profiles limit parameter and wherein determining the value n of the NF profiles limit parameter includes reading the value n of the NF profiles limit parameter from the NF discovery request.

3. The method of claim 1 wherein the NRF is configured with the value n of the NF profiles limit parameter and wherein determining the value n of the NF profiles limit parameter includes reading the configured value n of the NF profiles limit parameter.

4. The method of claim 1 wherein selecting the second number of NF profiles includes determining a value of an NF set mate selection parameter and setting the second number to the value of the NF set mate selection parameter.

5. The method of claim 1 wherein receiving the NF discovery request includes receiving the NF discovery request including a preferred locality attribute.

6. The method of claim 5 comprising setting the relative values of the NF profiles using the preferred locality attribute.

7. The method of claim 1 wherein selecting the first number k of NF profiles includes selecting k lowest priority NF profiles where k<n.

8. The method of claim 7 wherein selecting the second number of NF profiles includes selecting n–k NF profiles having NF set Ids matching NF set Ids in the list.

9. The method of claim 8 wherein selecting the n–k NF profiles includes, selecting, for each of n–k lowest priority NF profiles of the k NF profiles, an NF profile of an NF set mate.

10. The method of claim 1 comprising, at the requesting NF, receiving the NF discovery response, selecting an NF profile from the first number of NF profiles, routing an initial request to a first NF corresponding to the NF profile, receiving a response to the initial request indicating successful processing of the initial request, detecting failure of the first NF, selecting a second NF from the second number of NF profiles where the second NF is an NF set mate of the first NF and routing a subsequent request relating to the initial request to the second NF.

11. A system for selecting network function (NF) profiles of NF set mates for alternate routing, the system comprising:
an NF repository function (NRF) including at least one processor and a memory;
an NF profiles database stored in the memory; and
an NF profiles selection controller executable by the at least one processor for:
receiving, from a requesting NF, an NF discovery request,
accessing the NF profiles database and identifying, in the NF profiles database, a plurality of NF profiles that match query parameters in the NF discovery request,
determining a value n of an NF profiles limit parameter for limiting a number of NF profiles returned in an NF discovery response,
instead of selecting n of the NF profiles that match the query parameters without regard to NF set membership, selecting selecting, based on relative priorities assigned to the NF profiles and without regard to the NF set membership, a first number k of the NF profiles that is less than the value n of the NF profiles limit parameter,
recording NF set Ids of each of the k NF profiles in a list of NF set Ids to match;
selecting a second number of the NF profiles having NF set Ids that match the NF set Ids in the list and a sum of the first number k and the second number is less than or equal to the value n of the NF profiles limit parameter, generating an NF discovery response, and including, in the NF discovery response, the NF profiles in the first and second numbers of NF profiles, and transmitting the NF discovery response to the requesting NF.

12. The system of claim 11 wherein the NF discovery request includes the NF profiles limit parameter and the NF profiles selection controller is configured to read the value n of the NF profiles limit parameter by reading the value n of the NF profiles limit parameter from the NF discovery request.

13. The system of claim 11 wherein the NRF is configured with the value n of the NF profiles limit parameter and the NF profiles selection controller is configured to determine the value n of the NF profiles limit parameter by reading the configured value of the NF profiles limit parameter.

14. The system of claim 11 wherein selecting the second number of NF profiles includes determining a value of an NF set mate selection parameter and setting the second number to the value of the NF set mate selection parameter.

15. The system of claim 11 wherein the NF discovery request includes a preferred locality attribute.

16. The system of claim 15 wherein the NF profiles selection controller is configured to set the relative priorities of NF profiles using the preferred locality attribute.

17. The system of claim 11 wherein the NF profiles selection controller is configured to select the first number k of NF profiles by selecting k lowest priority NF profiles where k<n.

18. The system of claim 17 wherein the NF profiles selection controller is configured to select the second number of NF profiles by selecting n–k NF profiles having NF set Ids matching NF set Ids in the list.

19. The system of claim 18 wherein the NF profiles selection controller is configured to select the n–k NF profiles by selecting, for each of n–k lowest priority NF profiles of the k NF profiles, an NF profile of an NF set mate.

20. A non-transitory computer readable medium having stored thereon executable instructions that when executed by a processor of a computer control the computer to perform steps comprising:
receiving, at a network function (NF) repository function (NRF) and from a requesting NF, an NF discovery request;
accessing, by the NRF, an NF profiles database and identifying, in the NF profiles database, a plurality of NF profiles that match query parameters in the NF discovery request;
determining, by the NRF, a value n of an NF profiles limit parameter for limiting a number of NF profiles returned in an NF discovery response;
instead of selecting n of the NF profiles that match the query parameters without regard to NF set membership, selecting, by the NRF and based on relative priorities assigned to the NF profiles and without regard to the NF set membership, a first number k of the NF profiles that is less than the value n of the NF profiles limit parameter;
recording NF set Ids of each of the k NF profiles in a list of NF set Ids to match;
selecting, by the NRF, a second number of the NF profiles having NF set IDs that match the NF set Ids in the list and a sum of the first number and the second number is less than or equal to the value of the NF profiles limit parameter; and
generating an NF discovery response, and including, in the NF discovery response, the NF profiles in the first and second numbers of NF profiles.

* * * * *